United States Patent
Zou

(10) Patent No.: US 9,904,406 B2
(45) Date of Patent: Feb. 27, 2018

(54) IN-CELL TOUCH MODULE, ITS DRIVING METHOD, TOUCH DISPLAY PANEL AND DISPLAY DEVICE

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 56 days.

(21) Appl. No.: 14/889,159

(22) PCT Filed: Mar. 18, 2015

(86) PCT No.: PCT/CN2015/074468
§ 371 (c)(1),
(2) Date: Nov. 5, 2015

(87) PCT Pub. No.: WO2016/082378
PCT Pub. Date: Jun. 2, 2016

(65) Prior Publication Data
US 2016/0357306 A1 Dec. 8, 2016

(30) Foreign Application Priority Data
Nov. 28, 2014 (CN) .......................... 2014 1 0708448

(51) Int. Cl.
*G06F 3/044* (2006.01)
*G06F 3/041* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ........ G06F 3/044; G06F 3/046; G06F 3/0416; G06F 3/0412; G06F 3/041
See application file for complete search history.

(56) References Cited

U.S. PATENT DOCUMENTS 7,948,570 B2* 5/2011 Wang .................... H01L 27/124
349/43
8,654,083 B2* 2/2014 Hotelling ............. G09G 3/3648
345/173

(Continued)

FOREIGN PATENT DOCUMENTS

| CN | 101261559 A | 9/2008 |
| CN | 101681221 A | 3/2010 |

(Continued)

OTHER PUBLICATIONS

First Office Action regarding Chinese application No. 201410708448.9, dated Nov. 1, 2016. Translation provided by Dragon Intellectual Property Law Firm.

(Continued)

*Primary Examiner* — Patrick F Marinelli
(74) *Attorney, Agent, or Firm* — Harness, Dickey & Pierce, P.L.C.

(57) ABSTRACT

The present disclosure provides an in-cell touch module including N data lines arranged on an array substrate, and common electrodes insulated from, and arranged at a layer different from, the data lines. A $(2n-1)^{th}$ data line and a $(2n)^{th}$ data line are connected to each other through a switch, n is a positive integer, 2n is less than or equal to N, and N is an integer greater than 1. The common electrodes include a plurality of strip-like common electrodes and a plurality of U-shaped common electrodes. Each strip-like common electrode crosses the data lines, each U-shaped common electrode surrounds the respective strip-like common electrode, and each strip-like common electrode is insulated from each (Continued)

U-shaped common electrode. Each strip-like common electrode is connected to a capacitive touch sensing signal line, and an open end of each U-shaped common electrode is connected to an electromagnetic touch scanning line.

7 Claims, 4 Drawing Sheets

(51) Int. Cl.
 *G06F 3/046* (2006.01)
 *G02F 1/1333* (2006.01)
(52) U.S. Cl.
 CPC ............ *G06F 3/046* (2013.01); *G06F 3/0412* (2013.01); *G06F 2203/04111* (2013.01)

(56) References Cited

U.S. PATENT DOCUMENTS

| | | | | |
|---|---|---|---|---|
| 8,743,086 | B2* | 6/2014 | Chen | G06F 3/044 178/18.06 |
| 8,933,897 | B2* | 1/2015 | Liu | G06F 3/0412 178/18.06 |
| 2006/0290865 | A1* | 12/2006 | Choi | G02F 1/134363 349/141 |
| 2008/0062140 | A1* | 3/2008 | Hotelling | G09G 3/3648 345/173 |
| 2009/0027322 | A1* | 1/2009 | Hosotani | G09G 3/3688 345/87 |
| 2009/0225249 | A1* | 9/2009 | Wang | H01L 27/1288 349/43 |
| 2012/0154326 | A1* | 6/2012 | Liu | G06F 3/0412 345/174 |
| 2012/0154327 | A1* | 6/2012 | Liu | G06F 3/0412 345/174 |
| 2012/0162584 | A1* | 6/2012 | Chang | G06F 3/0412 349/106 |
| 2012/0169635 | A1* | 7/2012 | Liu | G06F 3/0412 345/173 |
| 2012/0169636 | A1* | 7/2012 | Liu | G06F 3/0412 345/173 |
| 2013/0069636 | A1* | 3/2013 | Kim | G01D 5/2053 324/207.17 |
| 2013/0113097 | A1* | 5/2013 | Yu | H01L 24/05 257/738 |
| 2013/0141084 | A1* | 6/2013 | Hsieh | G06F 3/046 324/207.16 |
| 2013/0181937 | A1* | 7/2013 | Chen | G06F 3/044 345/174 |
| 2014/0043284 | A1* | 2/2014 | Park | G06F 3/044 345/174 |
| 2014/0078104 | A1* | 3/2014 | Lee | G06F 3/044 345/174 |
| 2014/0092061 | A1* | 4/2014 | Akai | G06F 3/0418 345/174 |
| 2015/0145810 | A1* | 5/2015 | Shih | G06F 3/0416 345/174 |
| 2015/0199044 | A1* | 7/2015 | He | G06F 3/044 345/174 |
| 2015/0277601 | A1* | 10/2015 | Tahara | G06F 3/03545 345/173 |
| 2015/0277633 | A1* | 10/2015 | Jiang | G06F 3/046 345/174 |
| 2016/0004346 | A1* | 1/2016 | Zhao | G06F 3/0412 345/174 |
| 2016/0041677 | A1* | 2/2016 | Tahara | G06F 3/0416 345/174 |
| 2016/0062532 | A1* | 3/2016 | Tahara | G06F 3/046 345/173 |
| 2016/0124562 | A1* | 5/2016 | Lu | G06F 3/0412 345/174 |
| 2016/0139701 | A1* | 5/2016 | Wang | G06F 3/044 345/174 |
| 2016/0179266 | A1* | 6/2016 | Yang | G06F 3/044 345/174 |
| 2016/0188090 | A1* | 6/2016 | Lu | G06F 3/0416 345/174 |
| 2016/0202815 | A1* | 7/2016 | Zheng | G06F 3/044 345/174 |
| 2016/0283033 | A1* | 9/2016 | Lee | G06F 3/044 |
| 2016/0349921 | A1* | 12/2016 | Mizuhashi | G06F 3/046 |
| 2016/0357306 | A1* | 12/2016 | Zou | G06F 3/0416 |

FOREIGN PATENT DOCUMENTS

| | | |
|---|---|---|
| CN | 102609128 A | 7/2012 |
| CN | 103941946 A | 7/2014 |
| CN | 104049814 A | 9/2014 |
| CN | 104111760 A | 10/2014 |
| CN | 104375732 A | 2/2015 |
| CN | 204423346 U | 6/2015 |

OTHER PUBLICATIONS

International Search Report and Written Opinion of the International Searching Authority for international application No. PCT/CN2015/074468, dated Mar. 18, 2015.
Second Office Action regarding Chinese Application No. 201410708448.9, dated Jun. 28, 2017. Translation provided by Dragon Intellectual Property Law Firm.

* cited by examiner

IN-CELL TOUCH MODULE, ITS DRIVING METHOD, TOUCH DISPLAY PANEL AND DISPLAY DEVICE

CROSS-REFERENCE TO RELATED APPLICATION

The present application is the U.S. national phase of PCT Application No. PCT/CN2015/074468 filed on Mar. 18, 2015, which claims a priority of the Chinese patent application No. 201410708448.9 filed on Nov. 28, 2014, which is incorporated herein by reference in its entirety.

TECHNICAL FIELD

The present disclosure relates to the field of display technology, in particular to an in-cell touch module, its driving method, a touch display panel and a display device.

BACKGROUND

Along with the rapid development of display technology, touch panels have been widely used in our daily lives.

A capacitive touch panel has attracted more and more attentions due to such advantages as unique touch principle, high sensitivity, long service life and high light transmission. Currently, the capacitive touch panel usually includes a capacitive touch driving electrode and a capacitive touch sensing electrode. When the panel is touched by a finger, a coupling capacitance is generated between the finger and the capacitive touch driving electrode and the capacitive touch sensing electrode in the touch panel. Due to a change in the capacitance at a touch point, there are induced currents flowing from the capacitive touch driving electrode and the capacitive touch sensing electrode to the touch point, respectively, and at this time, coordinates of the touch point may be calculated accurately on the basis of the currents.

An electromagnetic touch panel has been widely used in high-level computer-aided drafting due to its handwriting feature. Currently, in order to achieve the touch by both the finger and a stylus, it is required to provide a capacitive mode and an electromagnetic mode in combination.

However, most of the existing touch panels with both the capacitive mode and the electromagnetic mode are add-on touch panels. As shown in FIG. 1, one existing add-on touch panel with both the capacitive mode and the electromagnetic mode includes, from bottom to top, an electromagnetic touch layer 11, a backlight unit (BLU) 12, an array substrate 13, a liquid crystal layer (LC), a color filter (CF) substrate 15 and a capacitive touch layer 16, i.e., the additional electromagnetic touch layer 11 and capacitive touch layer 16 are provided. As shown in FIG. 2, another existing add-on touch panel with both the capacitive mode and the electromagnetic mode includes, from bottom to top, a backlight unit 21, an array substrate 22, a liquid crystal layer 23, a color filter layer 24 and a touch layer 25 with both the electromagnetic mode and the capacitive mode, i.e., the additional touch layer 25 with both the electromagnetic mode and the capacitive mode is provided. For the existing add-on touch panel with both the capacitive mode and the magnetic mode, at least one additional touch layer is provided, resulting in an increase in a thickness of the touch panel as well as the production cost.

SUMMARY

A main object of the present disclosure is to provide an in-cell touch module, its driving method, a touch display panel and a display device, so as to provide the touch module without any additional touch layer, thereby to reduce a thickness and the production cost of the touch module, and improve the light transmission and an aperture ratio of the touch module.

In one aspect, the present disclosure provides in one embodiment an in-cell touch module, including N data lines arranged on an array substrate, and common electrodes insulated from, and arranged at a layer different from, the data lines. A $(2n-1)^{th}$ data line and a $(2n)^{th}$ data line are connected to each other through a switch, n is a positive integer, 2n is less than or equal to N, and N is an integer greater than 1. The common electrodes include a plurality of strip-like common electrodes and a plurality of U-shaped common electrodes. Each strip-like common electrode crosses the data lines, each U-shaped common electrode surrounds the respective strip-like common electrode, and each strip-like common electrode is insulated from each U-shaped common electrode. Each strip-like common electrode is connected to a capacitive touch sensing signal line, and an open end of each U-shaped common electrode is connected to an electromagnetic touch scanning line.

Alternatively, a gate metal layer, a gate insulating layer, an active layer and a source/drain metal layer are arranged sequentially on the array substrate, the source/drain metal layer includes the plurality of data lines, an insulating layer is deposited onto the array substrate with the source/drain metal layer, and the strip-like common electrodes and the U-shaped common electrodes are arranged on the insulating layer.

Alternatively, the insulating layer is a passivation layer or an organic resin layer.

Alternatively, a first via-hole and a second via-hole are provided in the insulating layer, the source/drain metal layer includes the capacitive touch sensing signal line and the electromagnetic touch scanning signal line, the strip-like common electrode is connected to the capacitive touch sensing signal line through the first via-hole, and the U-shaped common electrode is connected to the electromagnetic touch scanning signal line through the second via-hole.

Alternatively, the U-shaped common electrodes and the strip-like common electrodes are arranged in an interdigitated manner.

Alternatively, the two adjacent U-shaped common electrodes are opened in opposite directions.

Alternatively, the two adjacent U-shaped common electrodes are opened in an identical direction.

In another aspect, the present disclosure provides in one embodiment a method for driving the above-mentioned in-cell touch module, including, within each display period, steps of: at a display stage, turning off a switch, controlling data lines to receive a display data signal, and controlling strip-like common electrodes and U-shaped common electrodes to receive a common electrode signal; at a capacitive touch stage, turning off the switch, using the data lines as capacitive touch driving electrodes, using the strip-like common electrodes as capacitive touch sensing electrodes, controlling the data lines to sequentially receive a capacitive touch scanning signal, and determining coordinates of a touch point in accordance with a capacitive touch sensing signal transmitted by the strip-like common electrodes to a capacitive touch sensing signal line, thereby achieving the capacitive touch; and at an electromagnetic touch stage, turning on the switch, connecting a $(2n-1)^{th}$ data line to a $(2n)^{th}$ data line to serve as a first electromagnetic touch electrode, using the U-shaped common electrodes as a second electromagnetic electrode, controlling an electromagnetic touch scanning signal line to apply an electromagnetic touch scanning signal to the first electromagnetic touch electrode and the second electromagnetic touch electrode, and detecting a first electromagnetic touch sensing signal of the first electromagnetic touch electrode and a second electromagnetic touch sensing signal of the second electromagnetic touch electrode, thereby achieving the electromagnetic touch.

In yet another aspect, the present disclosure provides in one embodiment a touch display panel including the above-mentioned in-cell touch module.

In still yet another aspect, the present disclosure provides in one embodiment a display device including the above-mentioned in-cell touch module.

According to the in-cell touch module, its driving method, the touch display panel and the display device in the embodiments of the present disclosure, it is able to achieve the electromagnetic touch and the capacitive touch in combination through the common electrodes and the data lines arranged at different layers on the array substrate and insulated from each other without any additional touch layer, thereby to reduce the thickness and the production cost of the touch module, as well as to improve the light transmission and the aperture ratio of the touch module.

DETAILED DESCRIPTION

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

The present disclosure provides in one embodiment an in-cell touch module, which includes N data lines arranged on an array substrate, and common electrodes insulated from, and arranged at a layer different from, the data lines. A $(2n-1)^{th}$ data line and a $(2n)^{th}$ data line are connected to each other through a switch, n is a positive integer, 2n is less than or equal to N, and N is an integer greater than 1. The common electrodes include a plurality of strip-like common electrodes and a plurality of U-shaped common electrodes. Each strip-like common electrode crosses the data lines, each U-shaped common electrode surrounds the respective strip-like common electrode, and each strip-like common electrode is insulated from each U-shaped common electrode. Each strip-like common electrode is connected to a capacitive touch sensing signal line, and an open end of each U-shaped common electrode is connected to an electromagnetic touch scanning line.

According to the in-cell touch module in the embodiment of the present disclosure, it is able to achieve the electromagnetic touch and the capacitive touch in combination through the common electrodes and the data lines arranged at different layers on the array substrate and insulated from each other without any additional touch layer, thereby to reduce the thickness and the production cost of the touch module, as well as to improve the light transmission and the aperture ratio of the touch module.

During the operation, when it is required to perform the display by the in-cell touch module, the switch is turned off, the data line is configured to receive a display data signal, and the strip-like common electrodes and the U-shaped common electrodes are configured to receive a common electrode signal. When it is required to perform the capacitive touch, the switch is turned off, the data lines serve as a capacitive touch driving electrode, and the strip-like common electrodes serve as a capacitive touch sensing electrode. When it is required to perform the electromagnetic touch, the switch is turned on, the two adjacent data lines connected to each other serve as a first electromagnetic touch electrode, and the U-shaped common electrodes serve as a second electromagnetic touch electrode.

Alternatively, the U-shaped common electrodes and the strip-like common electrodes are arranged in an interdigitated manner, so as to facilitate the wiring at an insulating layer on the array substrate and to save the space.

Figure 1:
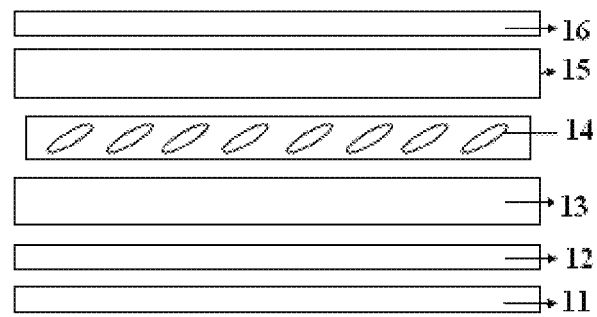
FIG. 1 is a schematic view showing an existing add-on touch panel with a capacitive mode and an electromagnetic mode.
Figure 2:
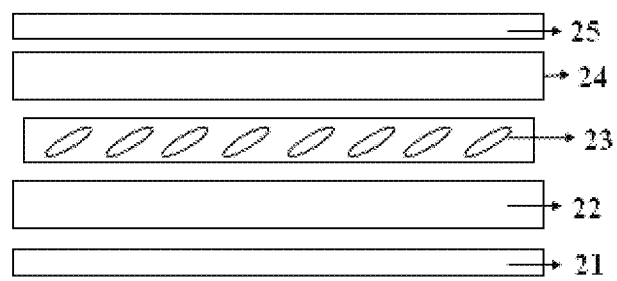
FIG. 2 is another schematic view showing the existing add-on touch panel with a capacitive mode and an electromagnetic mode.
Figure 3:
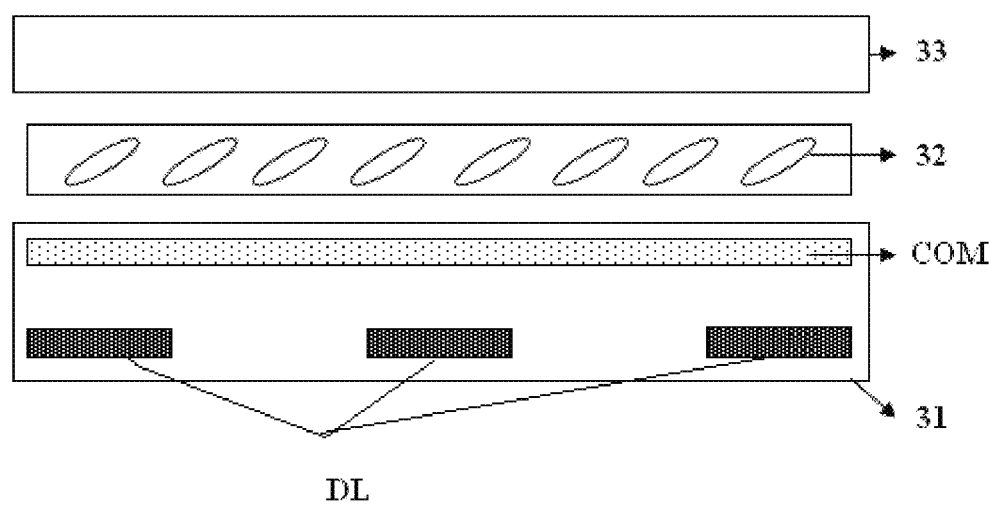
FIG. 3 is a schematic view showing an in-cell touch module according to one embodiment of the present disclosure.

Referring to FIG. 3, the in-cell touch module in the embodiments of the present disclosure includes, from bottom to top, an array substrate 31, a liquid crystal layer 32 and a color filter substrate 33. The data lines DL and the common electrode COM are arranged on the array substrate 31 and at different layers.

As shown in FIG. 3, for the in-cell touch panel in the embodiments of the present disclosure, it is able to achieve the electromagnetic touch and the capacitive touch in combination through the common electrodes and the data lines arranged at different layers on the array substrate without any additional touch layer, thereby to reduce the thickness and the production cost of the touch module, as well as to improve the light transmission and the aperture ratio of the touch module.

Figure 4:
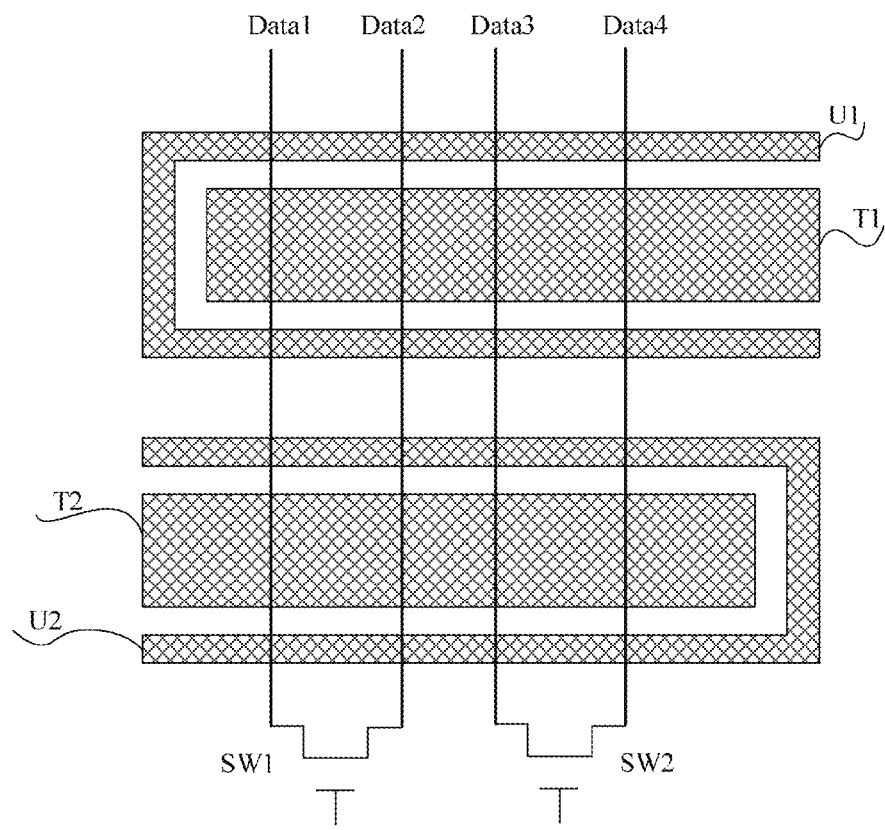
FIG. 4 is a schematic view showing the position relationship between common electrodes and data lines on an array substrate of the in-cell touch module according to one embodiment of the present disclosure.

To be specific, referring to FIG. 4, on the array substrate are arranged four data lines, e.g., a first data line Data1, a second data line Data2, a third date line Data3 and a fourth data line Data4. A lower end of Data1 is connected to a lower end of Data2 through a first switch SW1, and a lower end of Data3 is connected to a lower end of Data4 through a second switch SW2. A first strip-like electrode T1 and a second strip-like electrode T2 are arranged on the array substrate and cross the data lines. A first U-shaped electrode U1 and a second U-shaped electrode U2 are arranged on the array substrate. The first U-shaped electrode U1 is arranged in an interdigitated manner with the first strip-like electrode T1, and the second U-shaped electrode U2 is arranged in an interdigitated manner with the second strip-like electrode T2. U1 is opened in a direction opposite to U2.

Of course, as shown in FIG. 3, U1 may also be opened in a direction identical to U2. U1 and U2 are opened in opposite directions, so as to facilitate the wiring of metal wires at both sides of the array substrate, thereby to provide a product with a narrow bezel. The metal wires include the capacitive touch sensing signal line and the electromagnetic touch scanning signal line. More details will be given hereinafter.

To be specific, a gate metal layer, a gate insulating layer, an active layer and a source/drain metal layer are arranged sequentially on the array substrate, the source/drain metal layer includes the plurality of data lines, an insulating layer is deposited onto the array substrate with the source/drain metal layer, and the strip-like common electrodes and the U-shaped common electrodes are arranged on the insulating layer. The insulating layer may be an organic resin layer or a passivation layer.

To be specific, a first via-hole and a second via-hole are provided in the insulating layer, the source/drain metal layer includes the metal wires, i.e., the capacitive touch sensing signal line and the electromagnetic touch scanning signal line, the strip-like common electrode is connected to the capacitive touch sensing signal line through the first via-hole, and the U-shaped common electrode is connected to the electromagnetic touch scanning signal line through the second via-hole.

Alternatively, the two adjacent U-shaped common electrodes are opened in opposite directions, so as to facilitate the wiring at both sides of the array substrate, thereby to provide a product with a narrow bezel.

Figure 5A:
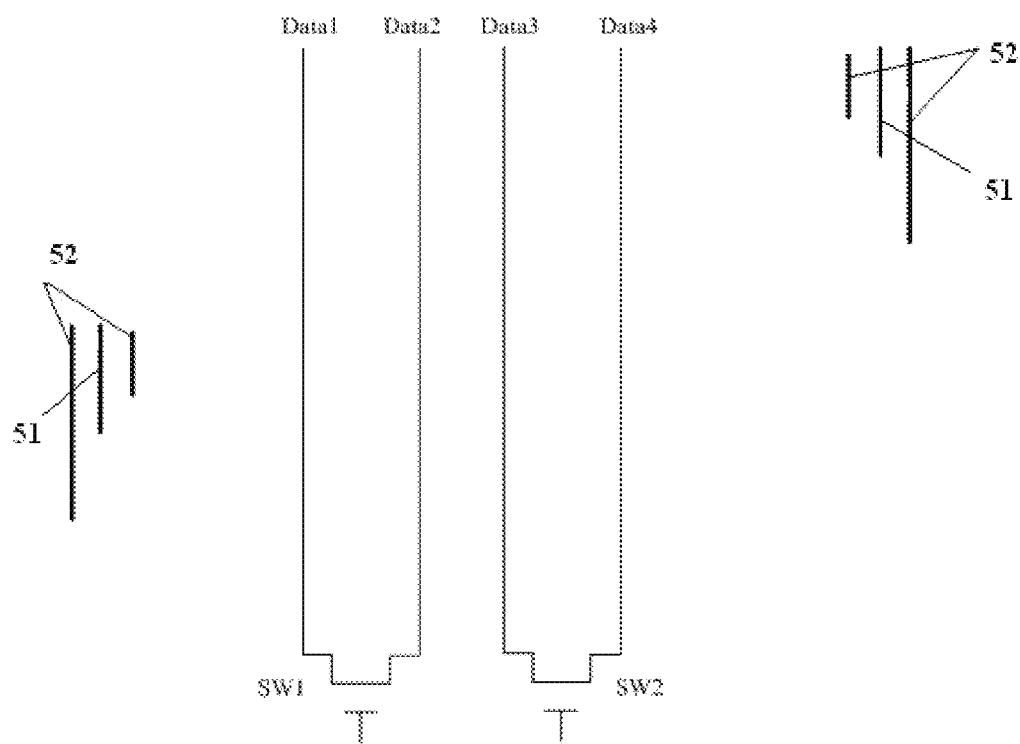
FIG. 5A is a schematic view showing the data lines and metal wires at a source/drain metal layer on the array substrate of the in-cell touch panel according to one embodiment of the present disclosure.
Figure 5B:
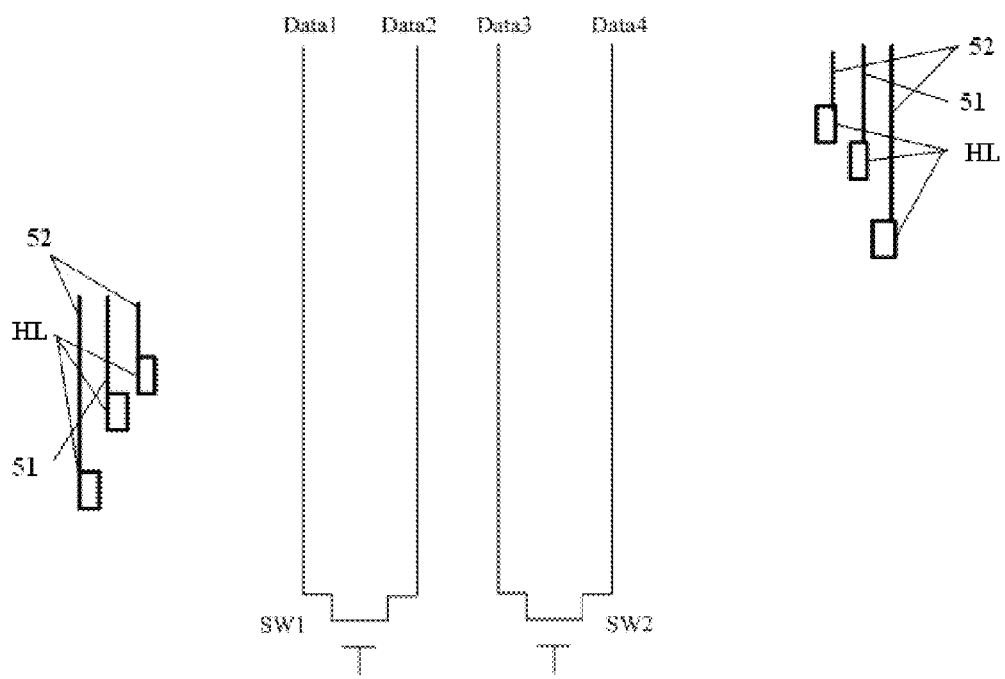
FIG. 5B is a schematic view showing via-holes provided in an organic resin layer or passivation layer on the array substrate of the in-cell touch module according to one embodiment of the present disclosure.
Figure 5C:
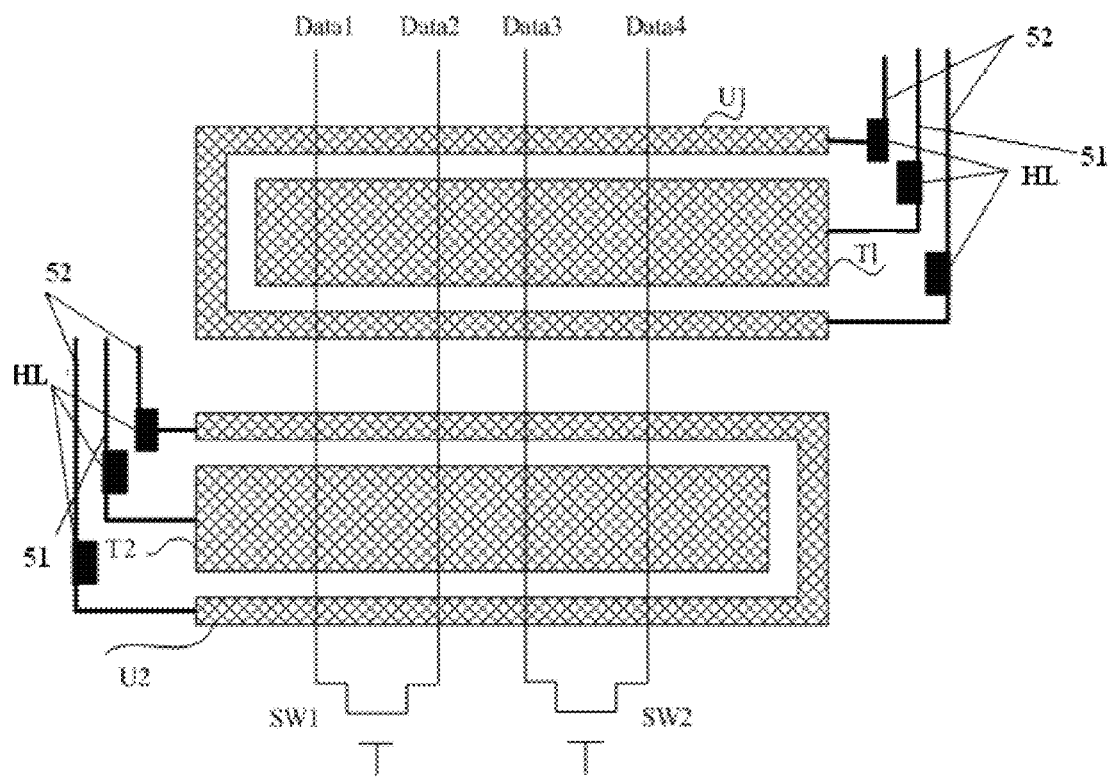
FIG. 5C is a schematic view showing the common electrodes at the organic resin layer or passivation layer on the array substrate of the in-cell touch panel, and the connection mode of the common electrodes to the metal wires at the source/drain metal layer through the via-holes according to one embodiment of the present disclosure.

A manufacture procedure of the array substrate of the in-cell touch panel will be described hereinafter in conjunction with FIGS. 5A-5C.

The gate metal layer, the gate insulating layer, the active layer and the source/drain metal layer are sequentially arranged on the array substrate. As shown in FIG. 5A, at the source/drain metal layer are provided with four data lines, i.e., the first data line Data1, the second data line Data2, the third data line Data3 and the fourth data line Data4. The lower end of Data1 is connected to the lower end of Data2 through the first switch SW1, and the lower end of Data3 is connected to the lower end of Data4 through the second switch SW2. The source/drain metal layer includes the capacitive touch sensing signal line 51 and the electromagnetic touch scanning signal line 52.

The organic resin layer or passivation layer (not shown) is deposited onto the array substrate with the source/drain metal layer. As shown in FIG. 5B, a plurality of via-holes HL is formed by a patterning process in the organic resin layer or passivation layer, and positions of the via-holes HL are determined in accordance with the subsequent wiring of the common electrodes. The common electrodes are formed at the organic resin layer or passivation layer, and patterned by a patterning process. As shown in FIG. 5C, the common electrodes include the first strip-like common electrode T1, the second strip-like common electrode T2, the first U-shaped common electrode U1 and the second U-shaped common electrode U2. T1 and T2 cross the data lines. The first U-shaped common electrode U1 is arranged in an interdigitated manner with the first strip-like common electrode T1, and the second U-shaped common electrode U2 is arranged in an interdigitated manner with the second strip-like common electrode T2, so as to save the space.

The common electrode at a surface of the organic resin layer or the passivation layer is connected to the metal wire at the source/drain metal layer through the via-hole HL. The first strip-like common electrode T1 and the second strip-like common electrode T2 are connected to the first capacitive touch sensing signal line 51, and the first U-shaped common electrode U1 and the second U-shaped common electrode U2 are connected to the electromagnetic touch scanning signal line 52. U1 and U2 are opened in opposite directions, so as to facilitate the wiring of the metal wires at both sides of the array substrate, thereby to provide a product with a narrow bezel as compared with the situation where the metal wires are merely arranged at one side of the array substrate.

The present disclosure further provides in one embodiment a method for driving the above-mentioned in-cell touch module, which includes steps of, within each display period, at the display stage, turning off the switch, controlling the data lines to receive the display data signal, and controlling the strip-like common electrodes and the U-shaped common electrodes to receive the common electrode signal; at the capacitive touch stage, turning off the switch, using the data lines as the capacitive touch driving electrodes, using the strip-like common electrodes as the capacitive touch sensing electrodes, controlling the data lines to sequentially receive the capacitive touch scanning signal, and determining coordinates of a touch point in accordance with the capacitive touch sensing signal transmitted by the strip-like common electrodes to the capacitive touch sensing signal line, thereby achieving the capacitive touch; and at the electromagnetic touch stage, turning on the switch, connecting the $(2n-1)^{th}$ data line to the $(2n)^{th}$ data line to serve as the first electromagnetic touch electrode, using the U-shaped common electrodes as the second electromagnetic electrode, controlling the electromagnetic touch scanning signal line to apply the electromagnetic touch scanning signal to the first electromagnetic touch electrode and the second electromagnetic touch electrode, and detecting the first electromagnetic touch sensing signal of the first electromagnetic touch electrode and the second electromagnetic touch sensing signal of the second electromagnetic touch electrode, thereby achieving the electromagnetic touch.

Figure 6:
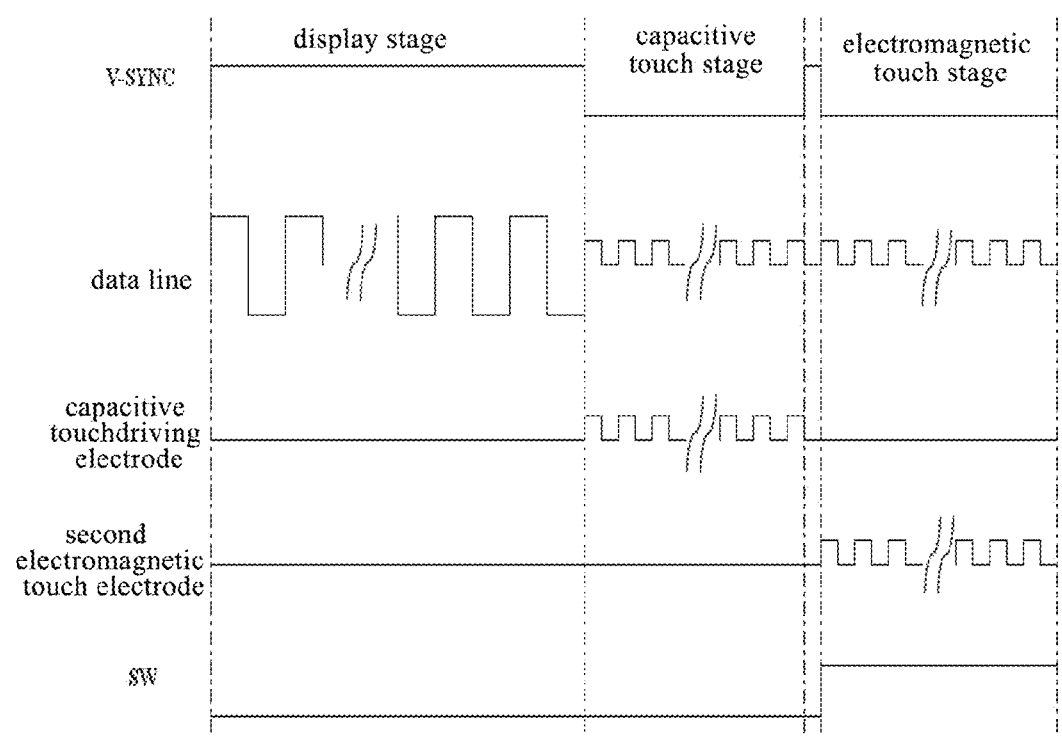
FIG. 6 is a sequence diagram of a method for driving the in-cell touch module according to one embodiment of the present disclosure.

As shown in FIG. 6, which is a sequence diagram of the method for driving the in-cell touch module, the in-cell touch module is driven within the display period of one frame in a time-division manner. To be specific, at the display stage, the data line is configured to receive the display data signal, the common electrode is configured to receive the common electrode voltage, and a switch control signal SW applied to a control end of the switch is a low level so as to turn off the switch. At the capacitive touch stage, the switch control signal SW is a low level, so as to turn off the switch. The capacitive touch driving electrodes, i.e., the data lines, are scanned progressively, and the coordinates of the touch point are determined in accordance with the capacitive touch sensing signal of the capacitive touch sensing electrodes, i.e., the common electrodes, so as to achieve the capacitive touch. At the electromagnetic touch stage, the switch control signal SW is a high level so as to electrically connect the two adjacent data lines. The first electromagnetic touch electrode formed by the two data lines crosses the second electromagnetic touch electrode formed by the U-shaped common electrodes, so as to achieve the electromagnetic touch. In FIG. 6, V-SYNC represents a synchronizing signal. When V-SYNC is a high level, the in-cell touch module is at the display stage, and when V-SYNC is a low level, the in-cell touch module is at the touch stage.

The present disclosure further provides in one embodiment a touch display panel including the above-mentioned in-cell touch module.

The present disclosure further provides in one embodiment a display device including the above-mentioned touch display panel. The display device may be a liquid crystal display device, e.g., a liquid crystal panel, a liquid crystal TV, a mobile phone or a liquid crystal display, or any other display device, e.g., an eBook.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An in-cell touch module, comprising:
    N data lines arranged on an array substrate, and common electrodes insulated from, and arranged at a layer different from, the N data lines,
    a $(2n-1)^{th}$ data line and a $(2n)^{th}$ data line are connected to each other through a switch, the $(2n-1)^{th}$ data line and the $(2n)^{th}$ data line adjacent to each other form a touch coil to implement an electromagnetic touch mode by turning on the switch, n is a positive integer, 2n is less than or equal to N, and N is an integer greater than 1;
    the common electrodes comprise a plurality of strip-like common electrodes and a plurality of U-shaped common electrodes;
    each strip-like common electrode crosses the N data lines, each U-shaped common electrode surrounds the respective strip-like common electrode, and each strip-like common electrode is insulated from each U-shaped common electrode;
    each strip-like common electrode is connected to a capacitive touch sensing signal line, and an open end of each U-shaped common electrode is connected to an electromagnetic touch scanning signal line, and
    a gate metal layer, a gate insulating layer, an active layer and a source/drain metal layer arranged sequentially on the array substrate,
    wherein the source/drain metal layer includes the N data lines, the capacitive touch sensing signal lines, and the electromagnetic touch scanning signal lines,
    wherein the N data lines, the capacitive touch sensing signal lines, and the electromagnetic touch scanning signal lines are separate and distinct from each other,
    wherein an insulating layer is deposited onto the array substrate with the source/drain metal layer, and the strip-like common electrodes and the U-shaped common electrodes are arranged on the insulating layer,
    wherein a plurality of first via-holes and a plurality of second via-holes are provided in the insulating layer, each of the strip-like common electrode is connected to a capacitive touch sensing signal line through one of the plurality of first via-hole, and each of the U-shaped common electrode is connected to an electromagnetic touch scanning signal line through one of the plurality of second via-holes, and
    wherein two adjacent U-shaped common electrodes are opened in opposite directions, and the second via-holes corresponding to the two adjacent U-shaped common electrodes are located on opposing sides of the N data lines, or
    wherein two adjacent U-shaped common electrodes are opened in an identical direction, and the second via-holes corresponding to the two adjacent U-shaped common electrodes are located on a same side of the N data lines.

2. The in-cell touch module according to claim 1, wherein the insulating layer is a passivation layer or an organic resin layer.

3. The in-cell touch module according to claim 1, wherein two adjacent U-shaped common electrodes are opened in an identical direction.

4. A method for driving the in-cell touch module according to claim 1, comprising, within each display period, steps of:
    at a display stage, turning off the switch, controlling the N data lines to receive a display data signal, and controlling strip-like common electrodes and U-shaped common electrodes to receive a common electrode signal;
    at a capacitive touch stage, turning off the switch, using the N data lines as capacitive touch driving electrodes, using the strip-like common electrodes as capacitive touch sensing electrodes, controlling the N data lines to sequentially receive a capacitive touch scanning signal, and determining coordinates of a touch point in accordance with a capacitive touch sensing signal transmitted by the strip-like common electrodes to a capacitive touch sensing signal line to achieve the capacitive touch; and
    at an electromagnetic touch stage, turning on the switch, connecting a $(2n-1)^{th}$ data line to a $(2n)^{th}$ data line to serve as a first electromagnetic touch electrode, using the U-shaped common electrodes as a second electromagnetic touch electrode, controlling an electromagnetic touch scanning signal line to apply an electromagnetic touch scanning signal to the first electromagnetic touch electrode and the second electromagnetic touch electrode, and detecting a first electromagnetic touch sensing signal of the first electromagnetic touch electrode and a second electromagnetic touch sensing signal of the second electromagnetic touch electrode to achieve the electromagnetic touch.

5. A touch display panel comprising the in-cell touch module according to claim 1.

6. A display device comprising the touch display panel according to claim 5.

7. The in-cell touch module according to claim 2, wherein the U-shaped common electrodes and the strip-like common electrodes are arranged in an interdigitated manner.

* * * * *